(12) United States Patent
Johansson et al.

(10) Patent No.: US 11,546,099 B2
(45) Date of Patent: Jan. 3, 2023

(54) ENABLING COMMUNICATION BETWEEN A COMMUNICATION DEVICES OF A SUBSTATIONS

(71) Applicant: ABB Schweiz AG, Baden (CH)

(72) Inventors: Morgan Johansson, Västerås (SE); Gargi Bag, Västerås (SE); Petri Hovila, Vaasa (FI); Luka Lednicki, Västerås (SE)

(73) Assignee: ABB Schweiz AG, Baden (CH)

( * ) Notice: Subject to any disclaimer, the term of this patent is extended or adjusted under 35 U.S.C. 154(b) by 105 days.

(21) Appl. No.: 16/975,065

(22) PCT Filed: Feb. 22, 2019

(86) PCT No.: PCT/EP2019/054411
§ 371 (c)(1),
(2) Date: Aug. 21, 2020

(87) PCT Pub. No.: WO2019/174890
PCT Pub. Date: Sep. 19, 2019

(65) Prior Publication Data
US 2021/0014648 A1    Jan. 14, 2021

(30) Foreign Application Priority Data
Mar. 13, 2018 (EP) .................... 18161410

(51) Int. Cl.
*H04L 1/18* (2006.01)
*H04L 47/34* (2022.01)
(Continued)

(52) U.S. Cl.
CPC ...... *H04L 1/1864* (2013.01); *H02J 13/00024* (2020.01); *H02J 13/00034* (2020.01);
(Continued)

(58) Field of Classification Search
CPC ........ H04W 4/06; H04L 1/1812; H04L 47/34; H04L 12/189; H04L 1/1678;
(Continued)

(56) References Cited

U.S. PATENT DOCUMENTS

| 2009/0067440 A1 * | 3/2009 | Chadda ................... H04L 45/74 370/401 |
| 2012/0046891 A1 | 2/2012 | Yaney et al. |

(Continued)

FOREIGN PATENT DOCUMENTS

| WO | WO-2009143287 A1 * | 11/2009 | ......... F16K 37/0091 |
| WO | 2017039493 A1 | 3/2017 | |

OTHER PUBLICATIONS

International Search Report and Written Opinion of the International Searching Authority Application No. PCT/EP2019/054411 Completed: Apr. 15, 2019; dated Apr. 25, 2019 13 pages.

(Continued)

*Primary Examiner* — Kwang B Yao
*Assistant Examiner* — Syed M Bokhari
(74) *Attorney, Agent, or Firm* — Whitmyer IP Group LLC

(57) ABSTRACT

A method for enabling communication over a cellular network between a first communication device of a first substation and a second communication device of a second substation. The substations are connected to a power transmission line. The method includes the steps of: receiving multicast communication from the first communication device, wherein the multicast communication including a plurality of multicast packets, and each multicast packet includes a phasor value associated with the first substation and a sequence number; receiving an acknowledgement from the second communication device, the acknowledgement including a plurality of sequence numbers of the most recently received multicast packets, that the second com- (Continued)

munication device has received from the first communication device; and determining a packet loss to the second communication device when there is a mismatch between the sequence numbers of the acknowledgment, when compared with the sequence numbers of the received multicast communication.

19 Claims, 3 Drawing Sheets

(51) Int. Cl.
*H04W 4/06* (2009.01)
*H02J 13/00* (2006.01)
*H04L 12/18* (2006.01)

(52) U.S. Cl.
CPC ............ *H04L 1/1812* (2013.01); *H04L 47/34* (2013.01); *H04W 4/06* (2013.01); *H02J 13/00028* (2020.01); *H04L 12/189* (2013.01)

(58) Field of Classification Search
CPC .............. H04L 1/1864; H02J 13/00028; H02J 13/00024; H02J 13/00075; Y02E 60/7853; Y04S 10/16; Y04S 40/126
USPC ................................ 370/312, 390, 401, 389
See application file for complete search history.

(56) References Cited

U.S. PATENT DOCUMENTS

| | | | |
|---|---|---|---|
| 2013/0315057 A1* | 11/2013 | Popa ................... | H04L 12/1886 370/252 |
| 2013/0336316 A1* | 12/2013 | Sudhaakar .............. | H04L 45/16 370/389 |
| 2015/0035681 A1* | 2/2015 | Bryson, Jr. ............ | G01D 21/00 340/870.02 |
| 2016/0277201 A1* | 9/2016 | Thubert .............. | H04L 12/1881 |

OTHER PUBLICATIONS

Yang Wenyu et al: "The Application of GSM and GPRS Technology in Monitoring System for HVDC System Earth Pole", Power System Technology, 2006, Powercon 2006. International Conference on, IEEE, Oct. 1, 2006 pp. 1-5.

* cited by examiner

ENABLING COMMUNICATION BETWEEN A COMMUNICATION DEVICES OF A SUBSTATIONS

TECHNICAL FIELD

The invention relates to a method, an edge computing device, a computer program and a computer program product for enabling communication over a cellular network between a first communication device of a first substation and a second communication device of a second substation, the first substation and the second substation being connected to a power transmission line.

BACKGROUND

Protective IEDs (Intelligent Electronic Devices), such as relays for line differential protection, currently use point to point wired communication when installed in different substations. The wired communication is reliable, but can be expensive to deploy and is not scalable. The cost can be reduced if the wired communication is replaced by utilizing the readily available communication infrastructure such as public cellular networks, enhancing flexibility and scalability while reducing cost.

However, current structures of cellular communication networks are not sufficiently reliable to be used for critical applications such as line differential protection.

US 2015/035681 A1 discloses point-to-multipoint polling in a monitoring system for an electric power distribution system. US 2012/046891 A1 discloses a method and apparatus for communicating power distribution event and location. WO 2017/039493 A1 discloses a method for transmitting downlink signals.

US 2012/046891 A1 discloses a method and an apparatus for communicating power distribution event and location.

WO 2017/039493 A1 discloses embodiments for transmitting downlink signals.

SUMMARY

It is an object to improve ability to detect lost packets when cellular communication networks are used for communication of phasor values.

According to a first aspect, it is provided a method for enabling communication over a cellular network between a first communication device of a first substation and a second communication device of a second substation. The first substation and the second substation are connected to a power transmission line. The method is performed in an edge computing device provided by a base station of the cellular network, the method comprises the steps of: receiving multicast communication from the first communication device, the multicast communication also being intended for the second communication device, wherein the multicast communication comprising a plurality of multicast packets, and each multicast packet comprises a phasor value associated with the first substation and a sequence number; receiving an acknowledgement from the second communication device, the acknowledgement comprising a plurality of sequence numbers of the most recently received multicast packets, that the second communication device has received from the first communication device; and determining a packet loss to the second communication device when there is a mismatch between the sequence numbers of the acknowledgment, when compared with the sequence numbers of the received multicast communication.

The method may further comprise the step of: determining a packet loss from the first communication device when there is a gap in the sequence numbers in packets of the multicast communication.

Each multicast packet may be transmission timestamped by the first communication device, in which case the step of receiving multicast communication comprises receipt timestamping each received multicast packet.

Each acknowledgement may be transmission timestamped by the second communication device, in which case the step of receiving an acknowledgement comprises receipt timestamping each received acknowledgement.

The first substation and the second substation may be electrical substations for managing electrical power transfer over the power transmission line.

According to a second aspect, it is provided an edge computing device for enabling communication over a cellular network between a first communication device of a first substation and a second communication device of a second substation. The first substation and the second substation are connected to a power transmission line, the edge computing device being configured to be provided by a base station of the cellular network. The edge computing device comprises: a processor; and a memory storing instructions that, when executed by the processor, cause the edge computing device to: receive multicast communication from the first communication device, the multicast communication also being intended for the second communication device, wherein the multicast communication comprising a plurality of multicast packets, and each multicast packet comprises a phasor value associated with the first substation and a sequence number; receive an acknowledgement from the second communication device, the acknowledgement comprising a plurality of sequence numbers of the most recently received multicast packets, that the second communication device has received from the first communication device; and determine a packet loss to the second communication device when there is a mismatch between the sequence numbers of the acknowledgment, when compared with the sequence numbers of the received multicast communication.

The edge computing device may further comprise instructions that, when executed by the processor, cause the edge computing device to: determine a packet loss from the first communication device when there is a gap in the sequence numbers in packets of the multicast communication.

Each multicast packet may be transmission timestamped by the first communication device, in which case the instructions to receive multicast communication comprise instructions that, when executed by the processor, cause the edge computing device to receipt timestamp each received multicast packet.

Each acknowledgement may be transmission timestamped by the second communication device, in which case the instructions to receive an acknowledgement comprise instructions that, when executed by the processor, cause the edge computing device to receipt timestamping each received acknowledgement.

The first substation and the second substation may be electrical substations for managing electrical power transfer over the power transmission line.

According to a third aspect, it is provided a computer program for enabling communication over a cellular network between a first communication device of a first substation and a second communication device of a second substation, the first substation and the second substation being connected to a power transmission line. The computer program comprising computer program code which, when run on a edge computing device provided by a base station of the cellular network, causes the edge computing device to: receive multicast communication from the first communication device, the multicast communication also being intended for the second communication device, wherein the multicast communication comprising a plurality of multicast packets, and each multicast packet comprises a phasor value associated with the first substation and a sequence number; receive an acknowledgement from the second communication device, the acknowledgement comprising a plurality of sequence numbers of the most recently received multicast packets, that the second communication device has received from the first communication device; and determine a packet loss to the second communication device when there is a mismatch between the sequence numbers of the acknowledgment, when compared with the sequence numbers of the received multicast communication.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the introduction of a plurality of latest received sequence numbers in acknowledgements (ACKs) sent as a response to received data packets. The ACKs are checked in an edge computing device which receives both the data packets and the ACKs. By checking the plurality of latest received sequence numbers against the received data packets, any data packets which have not been received can be detected.

Figure 1:
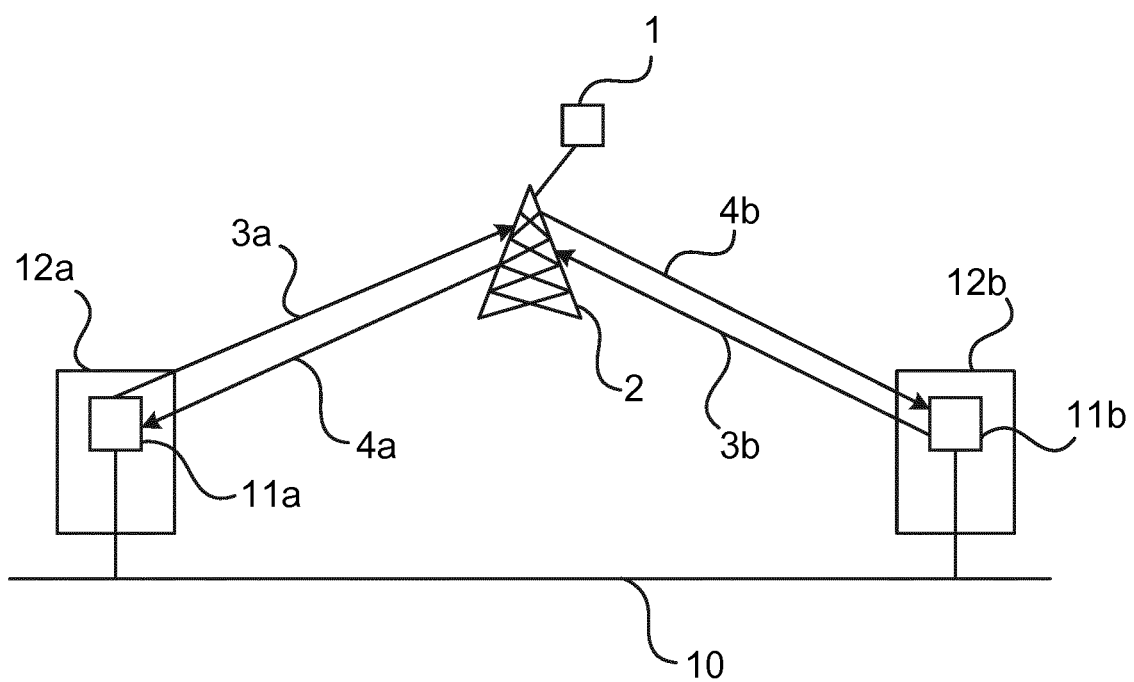
FIG. 1 is a schematic drawing illustrating an environment in which embodiments presented herein can be applied.

FIG. 1 is a schematic drawing illustrating an environment in which embodiments presented herein can be applied. A power transmission line 10 is used to transfer AC (Alternating Current) power in an electric grid. The transmission line 10 can transfer power in either direction. The transmission line 10 comprises separate cables for separate phases, e.g. three phases. The transmission is primarily a medium voltage (MV) transmission. For the purposes of the present disclosure, medium voltage (MV) relates to voltages higher than 1 kV AC and lower than 72 kV AC.

There is a first substation 12a and a second substation 12b. Each of the substations 12a, 12b obtains measurements of the transmission line 10. Both the first substation and the second substation are electrical substations for managing electrical power transfer over the power transmission line. For instance, the substations can comprise components for power conversion and/or power distribution. The measurements relate to voltages and/or currents and are expressed as phasors. By communicating the phasors between the two substations 12a, 12b and comparing the phasors, faults can be detected. For this fault detection, line differential analysis can be performed, as known in the art per se. This analysis can be performed in respective relays of the sub-stations 12a, 12b. In order to react quickly to any issues detected using the line differential analysis, latency of communication should be very low and reliability should be high.

A base station 2 of a cellular network provides cellular network coverage for the two substations 12a, 12b. While one base station 2 is shown here, multiple base stations 2 are often deployed to provide sufficient coverage. The first substation 12a comprises a first communication device 11a and the second substation 12b comprises a second communication device 11b. The base station 2, together with other base stations, form part of a Radio Access Network (RAN).

Each one of the first communication device 11a and the second communication device 11b comprise hardware and software to allow the second communication device to act as a cellular communication terminal, also known as User Equipment (UE), for communication with the base station 2 using a cellular communication network. The cellular communication network can e.g. comply with any one or a combination of LTE (Long Term Evolution), next generation mobile networks (fifth generation, 5G), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable.

Wireless cellular communication is prone to interference from other devices and sources operating in the same frequency bands in nearby cells. Moreover, attenuation occurs in extreme weather conditions and fading occurs due to obstructions. In order to use cellular communication for purposes of line differential analysis of a transmission line, both desired latency and reliability of the communication should be ensured. This implies that better granularity in channel supervision is needed in order to determine if a packet has been lost in uplink (communication device to base station) or downlink (base station to communication) direction compared with the prior art. This is achieved by providing, in each acknowledgement, indication of not only the last successfully received packet, but the last n successfully received packets. More details of this solution are provided below.

The first communication device iia can send uplink communication 3a to the base station 2 and receive downlink communication 4a from the base station 2. Analogously, the second communication device 11b can send uplink communication 3b to the base station 2 and receive downlink communication 4b from the base station 2. In other words, uplink communication 3a, 3b occurs from communication devices 11a, 11b to the base station 2 and downlink communication 4a, 4b occurs from the base station 2 to the communication devices 11a, 11b. Data is transmitted between the base station and the communication devices 11a, 11b in IP (Internet Protocol) packets.

In close proximity to the base station 2, there is an edge computing device 1. In other words, the edge computing device 1 is provided by the base station 2, i.e. at the same site as (e.g. within 50 metres of) the base station. By providing the edge computing device 1 by the base station 2, rather than in a central location for the whole network, latency is significantly reduced. Moreover, bandwidth requirements for inter network communication is reduced. The edge computing device 1 utilises what is called multi-access edge computing (MEC). MEC is a cloud computing capability at the edge of the RAN that offers storage and computational resources at the edge, for running low latency applications.

As explained in more detail below, the edge computing device 1 is used to detect communication errors between the first communication device iia and the second communication device iib.

It is to be noted that more substations and respective communication devices can be provided than those shown in FIG. 1.

Figure 2:
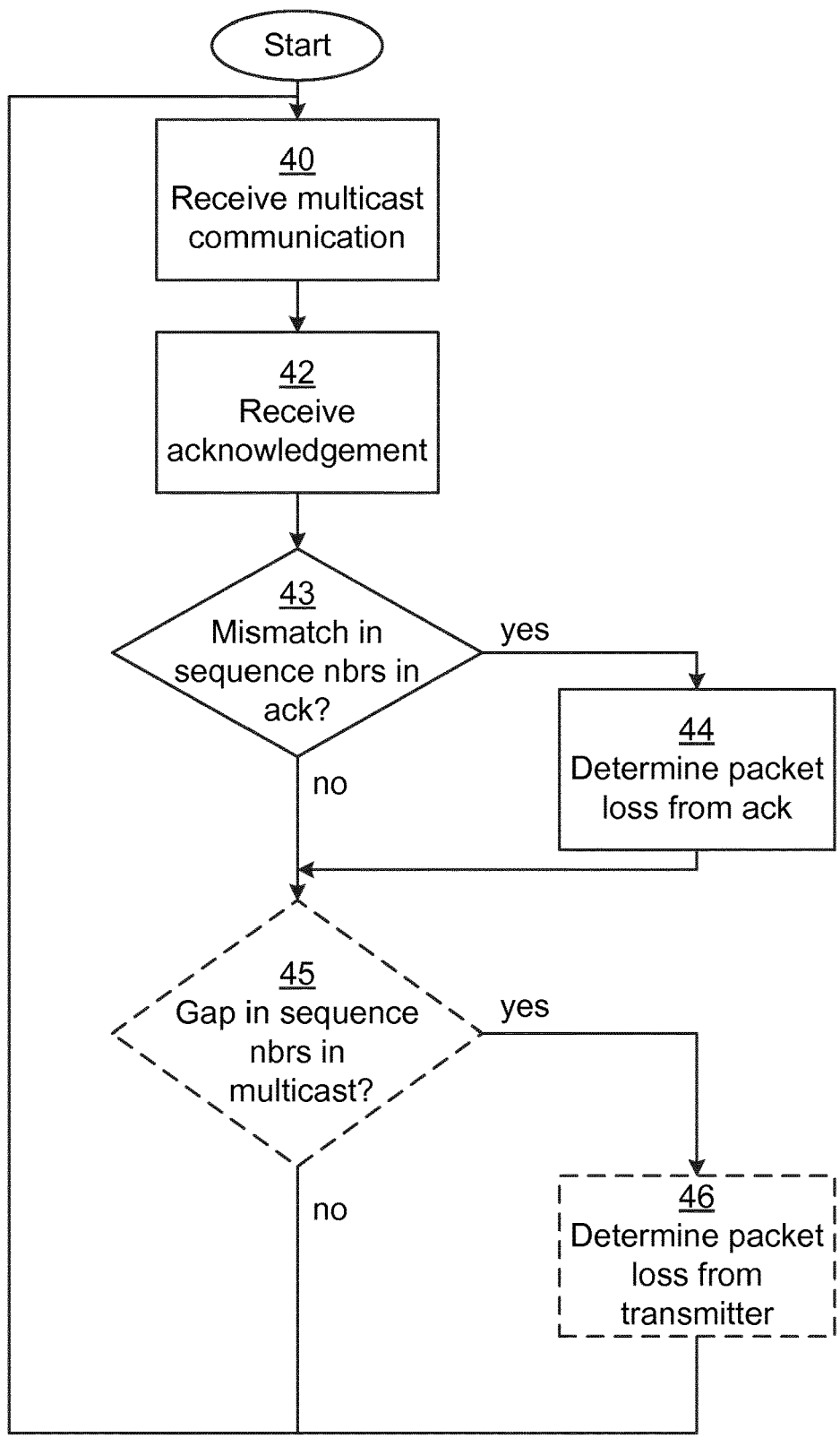
FIG. 2 is a flow chart illustrating embodiments of a method for enabling communication between a first communication device of a first substation and a second communication device of a second substation, as shown in FIG. 1.

FIG. 2 is a flow chart illustrating embodiments of a method for enabling communication over a cellular network between the first communication device of the first substation and the second communication device of the second substation, as shown in FIG. 1. The method is performed in the edge computing device provided by a base station of the cellular network.

In a receive multicast communication step 40, the edge computing device receives multicast communication from the first communication device. The multicast communication is also intended for the second communication device. In other words, both the edge computing device and the second communication device subscribe to multicast communication from the first communication device. The multicast communication comprises a plurality of multicast packets, each multicast packet comprising a phasor value associated with the first substation. Each multicast packet further comprises a sequence number, which has a very long repeat time, essentially making the sequence number unique for all practical purposes. Each multicast packet can be an IP packet.

Optionally, the first communication device timestamps each packet just before transmission and the edge computing device timestamps each packet just after receiving the packet. In this way, as long as the clocks are synchronised between the first communication device and the edge computing device, uplink communication latency between the first communication device and the edge computing device can be computed.

In a receive acknowledgement step 42, the edge computing device receives an acknowledgement (also known as an ACK) from the second communication device. The acknowledgement comprises a plurality of sequence numbers. The sequence numbers respectively pertain to the n number of most recently received multicast packets that the second communication device has received from the first communication device, where n is any integer greater than 1. The acknowledgement is also transmitted to the first communication device. The number of sequence numbers in the ACK is configurable but is always greater than one, except for the first ACK, when only one packet has been received by the second communication device from the first communication device. The second communication device transmits an ACK for each successfully received (multicast) packet from the first communication device.

Optionally, the second communication device timestamps each ACK just before transmission and the edge computing device timestamps each ACK just after receiving the ACK. In this way, as long as the clocks are synchronised between the second communication device and the edge computing device, uplink communication latency between the second communication device and the edge computing device can be computed.

In a conditional mismatch in sequence numbers in ack step 43, the edge computing device evaluates whether there is a mismatch in the sequence numbers of the acknowledgment, when compared with the sequence numbers of the received multicast communication. This can occur since multicast communication has occurred, whereby the edge computing device has also received the packets (and their respective sequence numbers) that was intended for the second communication device. Hence, any missing sequence number in the acknowledgement compared to the sequence numbers of the received multicast packets implies a packet loss to the second communication device.

This mismatch determination will now be illustrated with a couple of examples.

In a first example, n equals 3. The edge computing device has received packets with sequence numbers 105, 106, 107, 108, 109, 110. The most recent ACK received from the second communication device contains the sequence numbers 110, 109, 108. In this case, there is no mismatch, since the sequence numbers of the ACK corresponds to the n last sequence numbers of packets received by the edge computing device. Consequently a packet loss has not occurred in the communication from the first communication device to the second communication device.

In a second example, n again equals 3. The edge computing device has received packets with sequence numbers 105, 106, 107, 108, 109, 110. The most recent ACK received from the second communication device contains the sequence numbers 110, 109, 107. In this case, there is a mismatch, since the sequence numbers of the ack do not corresponds to the n last sequence numbers of packets received by the edge computing device. The ACK does not contain the sequence number 108 which is the sequence number of the third most recent packet received by the edge computing device.

If there is a mismatch, the method proceeds to a determine packet loss from ack step 44. Otherwise, the method proceeds to an optional conditional gap in sequence numbers in multicast step 45, or, if that step is not performed, the method repeats.

In the determine packet loss from ack step 44, the edge computing device determining that a packet loss has occurred to the second substation relay. In other words, there are one or more packets that the first communication device has transmitted that the second communication device never received. This information can be used for later action.

In an optional conditional gap in sequence numbers in multicast step 45, the edge computing device evaluates whether there is a gap in the sequence numbers in packets of the multicast communication. This evaluation works as long as the sequence numbers follow a predetermined path, e.g. the sequence numbers can increase by one on each occasion. In one example, sequence numbers 232, 233, 234 and 235 are in sequence and do not have a gap while sequence number 232, 233 and 235 have a gap, in a missing sequence number 234.

If there is a gap, the method proceeds to an optional determine packet loss from transmitter step 46. Otherwise, the method repeats.

In the optional determine packet loss from transmitter step 46, the edge computing device determines that there is a packet loss from the first substation relay. This implies that the edge computing device 1 never received such packet(s).

It is to be noted that while the method described above concerns communication from the first communication device to the second communication device, the same type of communication can occur in the other direction, from the second communication device to the first communication device.

Using the plurality of sequence numbers of the acknowledgement described above, it can be detected when there is a packet loss from the first communication device to the second communication device. Since the edge computing device has received the missing packet for the mismatch to occur, the packet loss must have occurred somewhere between the base station for the first communication device and the second communication device, i.e. in downlink communication.

When packet loss is detected in the edge computing device due to a gap in sequence numbers of the packets of the multicast communication, the lost packet(s) never reached the edge computing device. In such a case, the packet loss must have occurred somewhere between the first communication device and edge computing device, i.e. in uplink communication.

When packet losses occur, the edge computing device can trigger measures to reduce the effect of the packet loss. For instance, transmission power can be increased or the frequency of packets (containing the phasors) can be increased to reduce the impact of any one lost packet.

Using this method, reliability packet loss detection is greatly increased, allowing the edge computing device to take appropriate measures if and when packet losses do occur.

Additionally, it can be detected if the packet loss occurs in the uplink communication or downlink communication. This allows measures to be targeted to better mitigate the effects of the packet loss.

Figure 3:
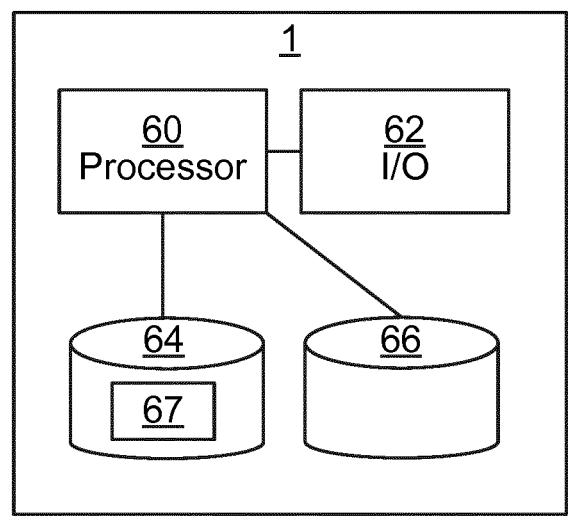
FIG. 3 is a schematic diagram illustrating components of an embodiment of the edge computing device of FIG. 1.

FIG. 3 is a schematic diagram illustrating components of an embodiment of the edge computing device 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory. The software instructions 67 can be in the form of one of several software applications which are executable by the processor 60.

A data memory 66 is also provided for reading and/or storing data during execution of software instructions in the processor 60. The data memory 66 can be any combination of RAM and/or ROM.

The edge computing device 1 further comprises an I/O interface 62 for communicating with other external entities. Optionally, the I/O interface 62 also includes a user interface. Other components of the edge computing device 1 are omitted in order not to obscure the concepts presented herein.

Figure 4:
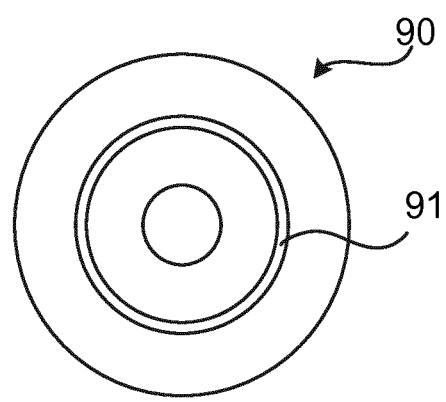
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for enabling communication between a first communication device of a first substation and a second communication device of a second substation, the first substation and the second substation being connected to a power transmission line, the method being performed in an edge computing device and comprising the steps of:

receiving multicast communication from the first communication device, the multicast communication also being intended for the second communication device, wherein the multicast communication comprising a plurality of multicast packets, and each multicast packet comprises a phasor value associated with the first substation and a sequence number;

receiving an acknowledgement from the second communication device, the acknowledgement comprising a plurality of sequence numbers of the most recently received multicast packets, that the second communication device has received from the first communication device; and determining a packet loss to the second communication device when there is a mismatch between the sequence numbers of the acknowledgment, when compared with the sequence numbers of the received multicast communication.

ii. The method according to embodiment i, further comprising the step of:

determining a packet loss from the first communication device when there is a gap in the sequence numbers in packets of the multicast communication.

iii. The method according to embodiment i or ii, wherein each multicast packet is transmission timestamped by the first communication device, and wherein the step of receiving multicast communication comprises receipt timestamping each received multicast packet.

iv. The method according to any one of the preceding embodiments, wherein each acknowledgement is transmission timestamped by the second communication device, and wherein the step of receiving an acknowledgement comprises receipt timestamping each received acknowledgement.

v. The method according to any one of the preceding embodiments, wherein the first substation and the second substation are electrical substations for managing electrical power transfer over the power transmission line.

vi. An edge computing device for enabling communication between a first communication device of a first substation and a second communication device of a second substation, the first substation and the second substation being connected to a power transmission line, the edge computing device comprising:
a processor; and
a memory storing instructions that, when executed by the processor, cause the edge computing device to:
receive multicast communication from the first communication device, the multicast communication also being intended for the second communication device, wherein the multicast communication comprising a plurality of multicast packets, and each multicast packet comprises a phasor value associated with the first substation and a sequence number; and
receive an acknowledgement from the second communication device, the acknowledgement comprising a plurality of sequence numbers of the most recently received multicast packets, that the second communication device has received from the first communication device;
determine a packet loss to the second communication device when there is a mismatch between the sequence numbers of the acknowledgment, when compared with the sequence numbers of the received multicast communication.

vii. The edge computing device according to embodiment vi, further comprising instructions that, when executed by the processor, cause the edge computing device to:
determine a packet loss from the first communication device when there is a gap in the sequence numbers in packets of the multicast communication.

viii. The edge computing device according to embodiment vi or vii, wherein each multicast packet is transmission timestamped by the first communication device, and wherein the instructions to receive multicast communication comprise instructions that, when executed by the processor, cause the edge computing device to receipt timestamp each received multicast packet.

ix. The edge computing device according to any one of embodiments vi to viii, wherein each acknowledgement is transmission timestamped by the second communication device, and wherein the instructions to receive an acknowledgement comprise instructions that, when executed by the processor, cause the edge computing device to receipt timestamp each received acknowledgement.

x. The edge computing device according to any one of embodiments vi to ix, wherein the first substation and the second substation are electrical substations for managing electrical power transfer over the power transmission line.

xi. A computer program for enabling communication between a first communication device of a first substation and a second communication device of a second substation, the first substation and the second substation being connected to a power transmission line, the computer program comprising computer program code which, when run on a edge computing device causes the edge computing device to:
receive multicast communication from the first communication device, the multicast communication also being intended for the second communication device, wherein the multicast communication comprising a plurality of multicast packets, and each multicast packet comprises a phasor value associated with the first substation and a sequence number;
receive an acknowledgement from the second communication device, the acknowledgement comprising a plurality of sequence numbers of the most recently received multicast packets, that the second communication device has received from the first communication device; and
determine a packet loss to the second communication device when there is a mismatch between the sequence numbers of the acknowledgment, when compared with the sequence numbers of the received multicast communication.

xii. A computer program product comprising a computer program according to embodiment xi and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling communication over a cellular network between a first communication device of a first substation and a second communication device of a second substation, the first substation and the second substation being connected to a power transmission line, the method being performed in an edge computing device provided by a base station of the cellular network, the method comprising the steps of: receiving multicast communication from the first communication device, the multicast communication also being intended for the second communication device, wherein the multicast communication includes a plurality of multicast packets, and each multicast packet includes a phasor value associated with the first substation and a sequence number; receiving an acknowledgement from the second communication device, the acknowledgement including a plurality of sequence numbers of the multicast packets that the second communication device has most recently received from the first communication device; determining a packet loss to the second communication device when there is a mismatch between the sequence numbers of the acknowledgment and the sequence numbers of the received multicast communication; and in response to determining the packet loss, triggering measures to reduce effects of the packet loss; wherein said triggering measures to reduce effects of the packet loss comprises increasing transmission power and/or frequency of multicast packets.

2. The method according to claim 1, further comprising the step of:
determining a packet loss from the first communication device when there is a gap in the sequence numbers in packets of the multicast communication.

3. The method according to claim 2, wherein each acknowledgement is transmission timestamped by the second communication device, and wherein the step of receiving an acknowledgement includes receipt timestamping each received acknowledgement.

4. The method according to claim 2, wherein the first substation and the second substation are electrical substations for managing electrical power transfer over the power transmission line.

5. The method according to claim 1, wherein each multicast packet is transmission timestamped by the first communication device, and wherein the step of receiving multicast communication includes receipt timestamping each received multicast packet.

6. The method according to claim 1, wherein each acknowledgement is transmission timestamped by the second communication device, and wherein the step of receiving an acknowledgement includes receipt timestamping each received acknowledgement.

7. The method according to claim 1, wherein the first substation and the second substation are electrical substations for managing electrical power transfer over the power transmission line.

8. The method according to claim 1, wherein said determining the packet loss comprises detecting whether the packet loss occurred in an uplink communication or a downlink communication.

9. The method according to claim 1, wherein said determining the packet loss comprises determining the sequence number of the multicast packet corresponding to the packet loss.

10. An edge computing device for enabling communication over a cellular network between a first communication device of a first substation and a second communication device of a second substation, the first substation and the second substation being connected to a power transmission line, the edge computing device being provided by a base station of the cellular network, the edge computing device comprising: a processor; and a memory storing instructions that, when executed by the processor, cause the edge computing device to: receive multicast communication from the first communication device, the multicast communication also being intended for the second communication device, wherein the multicast communication includes a plurality of multicast packets, and each multicast packet includes a phasor value associated with the first substation and a sequence number; and receive an acknowledgement from the second communication device, the acknowledgement including a plurality of sequence numbers of the multicast packets that the second communication device has most recently received from the first communication device; determine a packet loss to the second communication device when there is a mismatch between the sequence numbers of the acknowledgment and the sequence numbers of the received multicast communication; and in response to determining the packet loss, trigger measures to reduce effects of the packet loss; wherein said trigger measures to reduce effects of the packet loss comprises increasing transmission power and/or frequency of multicast packets.

11. The edge computing device according to claim 10, further comprising instructions that, when executed by the processor, cause the edge computing device to:
determine a packet loss from the first communication device when there is a gap in the sequence numbers in packets of the multicast communication.

12. The edge computing device according to claim 11, wherein each multicast packet is transmission timestamped by the first communication device, and wherein the instructions to receive multicast communication include instructions that, when executed by the processor, cause the edge computing device to receipt timestamp each received multicast packet.

13. The edge computing device according to claim 11, wherein each acknowledgement is transmission timestamped by the second communication device, and wherein the instructions to receive an acknowledgement include instructions that, when executed by the processor, cause the edge computing device to receipt timestamp each received acknowledgement.

14. The edge computing device according to claim 11, wherein the first substation and the second substation are electrical substations for managing electrical power transfer over the power transmission line.

15. The edge computing device according to claim 10, wherein each multicast packet is transmission timestamped by the first communication device, and wherein the instructions to receive multicast communication include instructions that, when executed by the processor, cause the edge computing device to receipt timestamp each received multicast packet.

16. The edge computing device according to claim 10, wherein each acknowledgement is transmission timestamped by the second communication device, and wherein the instructions to receive an acknowledgement include instructions that, when executed by the processor, cause the edge computing device to receipt timestamp each received acknowledgement.

17. The edge computing device according to claim 10, wherein the first substation and the second substation are electrical substations for managing electrical power transfer over the power transmission line.

18. A computer program for enabling communication over a cellular network between a first communication device of a first substation and a second communication device of a second substation, the first substation and the second substation being connected to a power transmission line, the computer program comprising computer program code which, when run on an edge computing device provided by a base station of the cellular network, causes the edge computing device to: receive multicast communication from the first communication device, the multicast communication also being intended for the second communication device, wherein the multicast communication includes a plurality of multicast packets, and each multicast packet includes a phasor value associated with the first substation and a sequence number; receive an acknowledgement from the second communication device, the acknowledgement including a plurality of sequence numbers of the multicast packets that the second communication device has most recently received from the first communication device; determine a packet loss to the second communication device when there is a mismatch between the sequence numbers of the acknowledgment and the sequence numbers of the received multicast communication; and in response to determining the packet loss, trigger measures to reduce effects of the packet loss; wherein said trigger measures to reduce effects of the packet loss comprises increasing transmission power and/or frequency of multicast packets.

19. A computer program product comprising: a computer program for enabling communication over a cellular network between a first communication device of a first substation and a second communication device of a second substation, the first substation and the second substation being connected to a power transmission line, the computer program comprising computer program code which, when run on an edge computing device provided by a base station of the cellular network, causes the edge computing device to: receive multicast communication from the first communication device, the multicast communication also being intended for the second communication device, wherein the multicast communication includes a plurality of multicast packets, and each multicast packet includes a phasor value associated with the first substation and a sequence number; receive an acknowledgement from the second communication device, the acknowledgement including a plurality of sequence numbers of the multicast packets that the second communication device has most recently received from the first communication device; determine a packet loss to the second communication device when there is a mismatch between the sequence numbers of the acknowledgment and the sequence numbers of the received multicast communication; and in response to determining the packet loss, trigger measures to reduce effects of the packet loss, and a computer readable means on which the computer program is stored; wherein said trigger measures to reduce effects of the packet loss comprises increasing transmission power and/or frequency of multicast packets.

\* \* \* \* \*